United States Patent [19]

Spencer, Jr.

[11] 3,800,181

[45] Mar. 26, 1974

[54] CATHODE RAY TUBE HIGH SPEED ELECTROMAGNETIC DEFLECTION FLYBACK CIRCUIT

[75] Inventor: James M. Spencer, Jr., Phoenix, Ariz.

[73] Assignee: Sperry Rand Corporation, Great Neck, N.Y.

[22] Filed: Dec. 21, 1972

[21] Appl. No.: 317,475

[52] U.S. Cl. ........................................... 315/27 TD
[51] Int. Cl. ........................................... H01j 29/70
[58] Field of Search ......... 315/27 TD, 27 R, 28, 29; 178/7.5 R

[56] References Cited

UNITED STATES PATENTS

| | | | |
|---|---|---|---|
| 3,440,485 | 4/1969 | Nix, Jr. et al. | 315/27 TD |
| 3,602,768 | 8/1971 | Williams | 315/27 TD |
| 3,529,206 | 9/1970 | Rodal | 315/27 TD |
| 3,488,552 | 1/1970 | Chandler et al. | 315/27 TD |
| 3,416,025 | 12/1968 | Gordon | 315/27 TD |

*Primary Examiner*—Maynard R. Wilbur
*Assistant Examiner*—J. M. Potenza
*Attorney, Agent, or Firm*—Howard P. Terry

[57] ABSTRACT

A cathode ray tube electron beam resonant flyback deflection circuit including a diode and an auxiliary inductive coil arranged in combination with the tube deflection coil and flyback capacitor such that energy is supplied to both the deflection coil and auxiliary coil during a line scan where upon activation of beam retrace interval the energy stored in both the deflecton coil and the auxiliary coil is initially transferred to the capacitor and thereafter transferred back to the deflection coil only. This action causes the deflection coil current to return to its starting condition in readiness for the next scan line in less time than would occur without the availability of the auxiliary coil energy being transferred to the deflection coil.

7 Claims, 6 Drawing Figures

CATHODE RAY TUBE HIGH SPEED ELECTROMAGNETIC DEFLECTION FLYBACK CIRCUIT

The invention herein described was made in the course of or under a contract, or subcontract thereunder, with the United States Government

BACKGROUND OF THE INVENTION

1. Field of the Invention

This invention relates to cathode ray tube electron beam deflection control systems and more particularly to a new and improved electromagnetic deflection circuit for reducing flyback time and thereby increasing the operational rate of the system.

2. Description of the Prior Art

As is now well understood to those skilled in the art, the conventional television raster scanning system operates on the principle of fast repetitive horizontal scanning of an electron beam across the screen of a cathode ray tube while simultaneously slowly deflecting the beam in a vertical direction so that each successive horizontal line is slightly displaced vertically from the preceding one until the bottom of the screen is reached whereupon the beam is returned to the top of the screen to repeat the procedure. The electron beam is normally blanked from the screen during the horizontal and vertical retrace intervals to preclude distortion of the video information written on the screen during the raster scan. In recent years it has been recognized that rather than blanking the beam during the comparatively long vertical retrace this interval may instead be efficaciously utilized for writing symbols on the cathode ray tube screen for display simultaneously with the information written during the raster scan. This is accomplished simply by directing the beam during the vertical retrace to the location on the screen where a symbol is to be presented and then momentarily unblanking it to enable writing of the symbol by means of appropriate signals applied to the horizontal and vertical deflection amplifiers. In any case, the relatively slowly varying vertical deflection and retrace can be conveniently provided by means of linear amplification but for the horizontal deflection, resonant non-linear operation is usually employed to obtain extremely fast retrace. Linear operation is preferred, however, for each horizontal scan line and for symbol writing during the vertical retrace. The horizontal deflection system therefore presents diverse needs, namely linear operation for line scanning and symbol writing and resonant non-linear operation for rapid retrace.

A prior art system which satisfies the dual mode requirements of the horizontal system is disclosed in U.S. Pat. No. 3,499,979, issued Mar. 10, 1970 to Fiorletta et al. and assigned to the assignee of the instant invention. Another prior art apparatus is disclosed in U.S. patent application Ser. No. 132,950, filed Apr. 12, 1971 in the name of H. Hilburn and assigned to the instant assignee. The present invention, however, is not specifically concerned with dual mode deflection systems but rather is directed to means for decreasing the flyback time in the resonant non-linear mode and it should be understood therefore that the above mentioned prior art Fiorletta et al. patent is referred to solely for the purpose of presenting background art with respect to which the present invention will be described. On the other hand, although the invention is not limited to a dual mode system, it is nevertheless particularly useful in such systems and in fact was devised for such use by the assignee. It will be readily appreciated that any reduction achieved in the total raster scan time, as by reducing the horizontal retrace time in accordance with the present invention, will offer the advantage of greater time for symbol writing by virtue of enabling the vertical retrace interval to be increased without reducing the overall repetitive raster scanning rate.

SUMMARY OF THE INVENTION

A cathode ray tube horizontal electromagnetic deflection system typically comprises an amplifier connected to supply a repeating sawtooth varying current to a deflection yoke, for sweeping the electron beam of the tube in a repetitive line-by-line fashion, and a capacitor either continuously or switchably coupled to the yoke, depending on the operational characteristics of a particular system, for the purpose of effecting a resonant discharge between the yoke and capacitor at selected times to achieve rapid non-linear retrace of the beam at the end of each scan line to return the beam to the other side of the screen for commencement of the next line scan.

In accordance with the principles of the present invention, a diode and an auxiliary inductive coil are serially connected and coupled to the deflection coil. During each scan line the drive amplifier supplies current to the deflection coil and by conduction through the diode also supplies current to the auxiliary coil. At the instant retrace is initiated, as by the application of a synchronizing pulse, the deflection coil and auxiliary coil resonantly discharge into the capacitor until the current flowing in the capacitor decreases to zero at which time the coil voltage reaches a peak and thereafter begins to decrease as current commences to flow from the capacitor back into the coil. The reverse current flow from the capacitor is directed only into the coil and not into the auxiliary coil inasmuch as the diode connected to the auxiliary coil is reverse biased under these conditions. As a result of this action the coil current returns to its initial value in readiness for the next line scan in less time than would be necessary in the absence of the diode and auxiliary coil. A more thorough explanation of the foregoing operation is provided in the detailed description provided hereinafter with reference to the accompanying drawings.

DESCRIPTION OF THE PREFERRED EMBODIMENT

Figure 1:
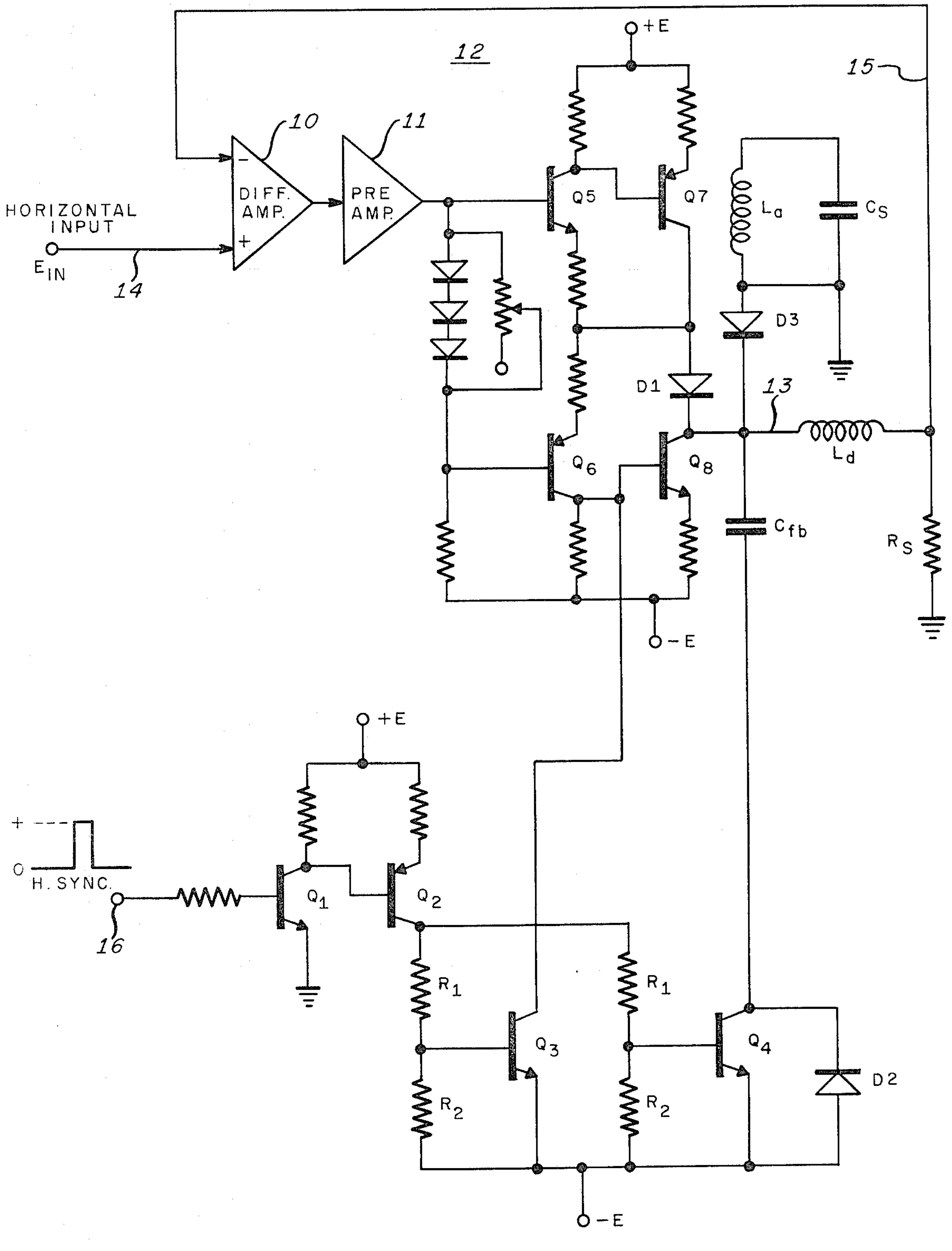
FIG. 1 is an electrical circuit schematic illustration of a preferred embodiment of the invention.

FIG. 1 depicts an illustrative horizontal deflection amplifier, the details and functioning of which may be substantially the same as disclosed in the above-mentioned Hilburn application. The input section of the amplifier comprises a conventional differential amplifier 10 cascaded with a pre-amplifier 11. The power output stage 12 provides the majority of the deflection coil $L_d$ drive current amplification and comprises a symmetrical, complementary modified Darlington emitter follower. Transistors Q5 and Q7 form an equivalent NPN power section, while transistors Q6 and Q8 form an equivalent PNP power section. Output stage 12 connects via lead 13 to one end of deflection coil $L_d$, the other end of which is connected to a current sampling resistor $R_S$. Lead 13 also connects output stage 12 to the cathode of diode D3 which has its anode coupled through auxiliary inductive coil $L_a$ to ground. The junction of the deflection coil and sampling resistor connects back to one input terminal of differential amplifier 10 for comparison in linear mode operation with the control input signal $E_{in}$ applied on lead 14 to the other input terminal of the differential amplifier. Lead 13, connecting power output stage 12 to the deflection coil $L_d$ and auxiliary coil $L_a$, also connects to the upper side of flyback capacitor $C_{fb}$ which, as will be described later, forms a resonant circuit with the deflection coil $L_d$ to supply the large flyback voltage spike required for resonant retrace. The other side of the flyback capacitor remote from the deflection coil connects to the junction of the cathode of diode D2 and collector of transistor Q4 which are connected in parallel, the emitter of the transistor and anode of the diode being tied to the -E potential source so that diode D2 is normally reverse biased in linear mode operation as will be explained momentarily. The parallel connection of diode D2 and transistor Q4 forms a bidirectional switch, one half of which is passive and the other half of which can be actively controlled by a switching signal applied to terminal 16 as will be explained momentarily.

Transistor Q3 acts as another switch which is responsive to the signal applied to terminal 16. The input to the lower section of the output of power amplifier stage 12, that is the base of transistor Q8, is connected to the collector of transistor Q3 which has its emitter connected to the -E potential source. Diode D1 connected between the collector of transistor Q7 and on end of the deflection coil serves to transmit current to the coil during conductive operation of transistors Q5 and Q7 and to protect these transistors from the large flyback voltage spike which is produced during the resonant retrace.

Linear amplifier operation is obtained during a horizontal sweep or vertical retrace of a raster scan simply by holding transistors Q3 and Q4 in a non-conductive state. This is accomplished by maintaining the signal at terminal 16 close to zero in the absence of a synchronizing pulse applied thereto whereby transistors Q1 and Q2 are held in a non-conductive state and thus act to render transistors Q3 and Q4 also non-conductive. Under such conditions, the horizontal input signal $E_{in}$ (FIG. 2*a*) applied to lead 14 of the differential amplifier is compared with the feedback signal supplied via lead 15. Any difference between the input and feedback signals is amplified in the differential amplifier, further amplified in preamplifier 11 and applied to power output stage 12 which supplies deflection current to the coil in one direction or the other in accordance with the conductivity of transistors Q7 and Q8. Inasmuch as the feedback voltage is proportional to the current through the deflection coil the deflection current is made precisely proportional to the horizontal input signal $E_{in}$.

Detailed operation of the circuit is as follows. Referring to FIGS. 2*a* to 2*e*, commencing at instant $t_1$ and during the interval to time $t_2$ while the horizontal sweep signal $E_{in}$ (FIG. 2*a*) is decreasing substantially uniformly from a positive peak to a negative peak the deflection coil current (FIG. 2*b*) is caused to change correspondingly through push-pull operation of power output stage 12. The deflection coil voltage (FIG. 2*c*) is at an essentially constant small negative level during this interval as described in the aforementioned Hilburn application. As a result of this small negative voltage on the end of the deflection coil adjacent the amplifier output current also flows through diode D3 into coil $L_a$ simultaneously with the current flow through the diode. The slight variation from constancy or linearity of the yoke voltage indicated in the drawings is a consequence of a small yoke current slope variation which is deliberately introduced as so called S-shaping to compensate for the geometry of the cathode ray tube with which the deflection system is used. the S-shaping assures constant velocity of the electron beam across the screen irrespective of the screen radius of curvature relative to the radius of beam deflection. The signal inversions through the stages of the amplifier are arranged so that transistors Q5 and Q7 control the positive current through the deflection coil for the positive half of the input saw-tooth voltage while transistors Q6 and Q8 control the negative current through the deflection coil for the negative half of the input sawtooth voltage during the interval $t_1$ to $t_2$ to produce the illustrated negatively sloped deflection coil current.

Termination of the horizontal sweep precisely at instant $t_2$ and commencement of the resonant non-linear retrace is accomplished by application of a positive going synchronizing pulse (FIG. 2*d*) to input terminal 16 for the purpose of turning NPN transistor Q1 on, which in turn actuates PNP transistor Q2 and appropriately level shifts the synchronizing pulse to produce a drive signal from positive potential source +E through transistor Q2 and resistors R1, R2 for application to the base terminal of transistors Q3 and Q4. Upon receiving this level-shifted synchronizing pulse, transistors Q3 and Q4 are driven into saturation. The saturated state of transistor Q3 diverts the amplifier output from the base of transistor Q8 forcing that transistor to a non-conductive state. Note though that input $E_{in}$ has at this time gone positive which normally would cause transistors Q5 and Q7 to become conductive. Upon transistor Q8 being driven into a non-conductive state, however, and before transistors Q5 and Q7 have a chance to conduct very much, if at all, the deflection coil-capacitor circuit is momentarily effectively disconnected from the amplifier output as a consequence of the non-conductive state of transistor Q8 and a reverse bias being established across diode D1. At the same time, as previously stated, transistor Q4 is also driven into saturation. This places the flyback capacitor $C_{fb}$ in current flowing connection with the deflection coil by way of a circuit comprising the series combination of the −E potential source, transistor Q4, flyback capacitor $C_{fb}$, deflection coil $L_d$ and sampling resistor $R_s$. Formation of this circuit causes a resonant discharge of the deflection coil current into the fly-back capacitor resulting in the deflection coil voltage going to a very high positive maximum at the instant the current flow through the circuit reaches zero. This high positive voltage on the coil holds diode D1 in a reverse biased condition to assure that the deflection coil-capacitor circuit remains effectively disconnected from the amplifier output. During the positive going excursion of the deflection coil voltage, current also flows from coil $L_a$ through diode D3 into the capacitor. At first it might seem that the high positive voltage at the top end of the deflection coil would cause diode D3 to be reverse biased at this time and thereby terminate current flow in coil $L_a$, but the action of the deflection coil voltage in attempting to terminate this current is countered in accordance with Lenz's Law by a high positive potential being established on the anode side of diode D3. This occurs because the small stray capacitance $C_s$ associated with coil $L_a$ forms a very fast time constant circuit which enables the potential on the anode side of diode D3 to rise faster than the potential on the cathode side. As a result, during the interval the deflection coil voltage is rising to a positive peak, current flows from both the deflection coil and the auxiliary coil into the flyback capacitor. Also, during this interval the potential at the collector of transistor Q4 is slightly less negative than −E as a consequence of transistor Q4 being in saturation and therefore diode D2 remains reverse biased as it was prior to transistor Q4 being switched on. Once the condition of zero current is reached, however, with the capacitor being fully charged, the current flow reverses and the deflection coil voltage begins to decrease rapidly until time $t_3$. This decrease of positive voltage on the deflection coil side of the capacitor is tantamount to an increase in the negative voltage on the other side of the capaictor which has the effect of establishing a strong forward bias across the collector to base junction of transistor Q4 causing it to operate in a reverse or low current gain mode and at the same time forward biasing diode D2 so that most of the current flow occuring in the resonant condition from the instant of peak deflection coil voltage to time $t_3$ occurs through the diode. During the period from the instant of peak deflection coil voltage to time $t_3$, therefore, current flows from the capacitor back into the deflection coil. Current does not flow back into coil $L_a$, however, since diode D3 is now reverse biased.

Figures 2A, 2B, 2C, 2D, 2E:
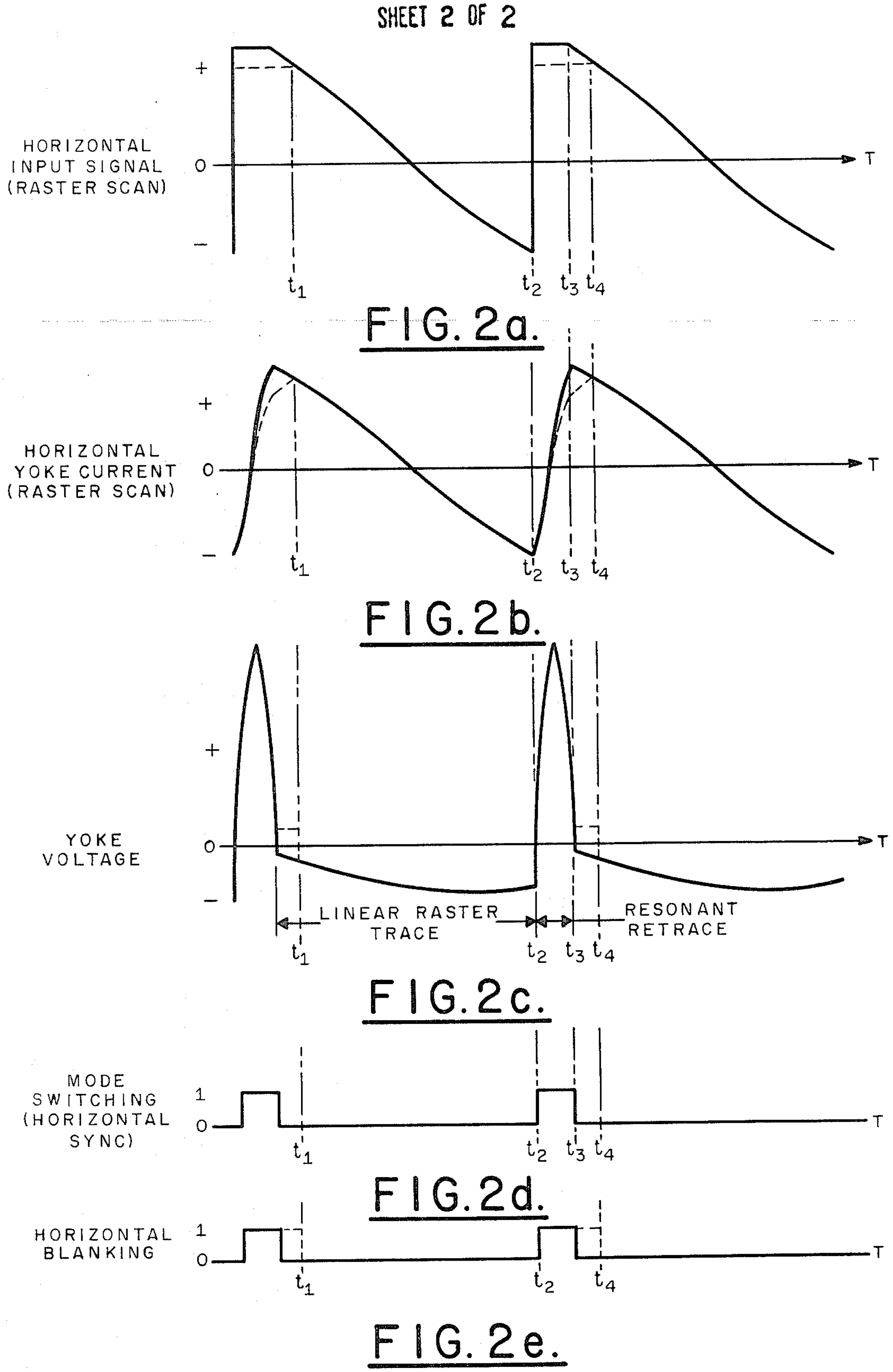
FIGS. 2*a* to 2*e* depict waveforms useful for explaining the operation of the circuit embodiment of the invention shown in FIG. 1.

The consequence of the aforedescribed action is that during the interval $t_2$ to $t_3$ current is initially supplied to the capacitor from both the deflection coil and auxiliary coil $L_a$ with the result that the energy stored in the deflection coil and auxiliary coil during the interval $t_1$ to $t_2$ is transferred to the capacitor during the first part of interval $t_2$ to $t_3$; and thereafter when the current flow reverses, the capacitor energy is transferred back only to the deflection coil. This has the effect of enabling the deflection coil current to return to its initial positive peak value in less time than would be required in the absence of diode D3 and coil $L_a$. For comparison purposes, the dashed line segments of FIGS. 2*b* and 2*c* indicate the shape the deflection coil current and voltage waveforms would have without the feature of the present invention and will be noted to be identical to the waveforms depicted in the aforementioned Hilburn application. In the case of the present invention, therefore, immediately upon removing the synchronizing pulse from terminal 16, the system is ready to begin the next line scan. Satisfactory operation in the foregoing manner has been achieved with a deflection coil inductance of 150 microhenrys, coil $L_a$ inductance of 875 microhenrys, flyback capacitor of 0.0068 microfarads and sampling resistor of 1 ohm. As is indicated in FIG. 2*e*, a blanking pulse is operative during the interval of the synchronizing pulse to block the electron beam from the cathode ray tube screen during the retrace.

Linear operation of the horizontal deflection system during the entire vertical retrace interval for the purpose of symbol writing may be obtained simply by inhibiting the presentation of synchronizing pulses at terminal 16 whereby the flyback capacitor remains continuously disconnected from current flowing circuit relation with the deflection coil. During such operation the beam is blanked from the cathode ray tube screen while being positioned for writing and then unblanked only for the writing interval.

While the invention has been described in its preferred embodiments, it is to be understood that the words which have been used are words of description rather than limitation and that changes may be made within the purview of the appended claims without departing from the true scope and spirit of the invention in its broader aspects.

I claim:

1. A cathode ray tube electron beam deflection control system comprising a deflection coil, a capacitor coupled to the deflection coil, an amplifier having its ouput coupled to the deflection coil and responsive to an input signal representative of desired motion of the beam for supplying current to the deflection coil to scan the electron beam across the cathode ray tube screen for a predetermined direction of slope of the input signal until the direction of slope reverses to establish a resonant condition between the deflection coil and capacitor for retracing the electron beam rapidly back across the screen, and unidirectional current conductive means and an auxiliary coil connected in series from the junction of the deflection coil and amplifier output, said unidirectional current conductive means being poled so that current is also supplied to the auxiliary coil from the amplifier during the scan interval until the instant of slope reversal of the input signal at which time the deflection coil and auxiliary coil resonantly discharge into the capacitor to charge said capacitor to a peak voltage so that the unidirectional current conductive means becomes reverse biased and energy stored in the capacitor is then transferred back to the deflection coil exclusive of the auxiliary coil whereby the beam retrace time is decreased.

2. The apparatus of claim 1 including means for switchably connecting the capacitor in and out of current flowing circuit relation with both the deflection coil and auxiliary coil such that the capacitor is disconnected from both coils during the scan interval and connected to both coils during the retrace interval.

3. The apparatus of claim 1 including means for effectively switchably connecting the amplifier with both coils such that the amplifier is coupled to the coils during the scan interval and uncoupled from the coils during the retrace interval.

4. The apparatus of claim 1 wherein the unidirectional current conductive means is connected intermediate the deflection coil and auxiliary coil.

5. The apparatus of claim 4 including means for effectively switchably connecting the amplifier with both coils such that the amplifier is coupled to the coils during the scan interval and uncoupled from the coils during the retrace interval.

6. The apparatus of claim 5 including means for switchably connecting the capacitor in and out of current flowing circuit relation with both coils such that the capacitor is disconnected from the coils during the scan interval and connected to the coils during the retrace interval.

7. The apparatus of claim 6 including an impedance connected in series with the deflection coil for providing a voltage representative of the current flowing therethrough to be fed back to the input of the amplifier for comparison with the input signal to derive an error signal equal to the difference between the input and feedback signals for controlling the current supplied by the amplifer.

* * * * *

UNITED STATES PATENT OFFICE
CERTIFICATE OF CORRECTION

Patent No. 3,800,181 Dated March 26, 1974

Inventor(s) James M. Spencer, Jr.

It is certified that error appears in the above-identified patent and that said Letters Patent are hereby corrected as shown below:

In Fig. 1 relocate the ground symbol ( ⏚ ) from below capacitance $C_S$ to above capacitance $C_S$ as follows:

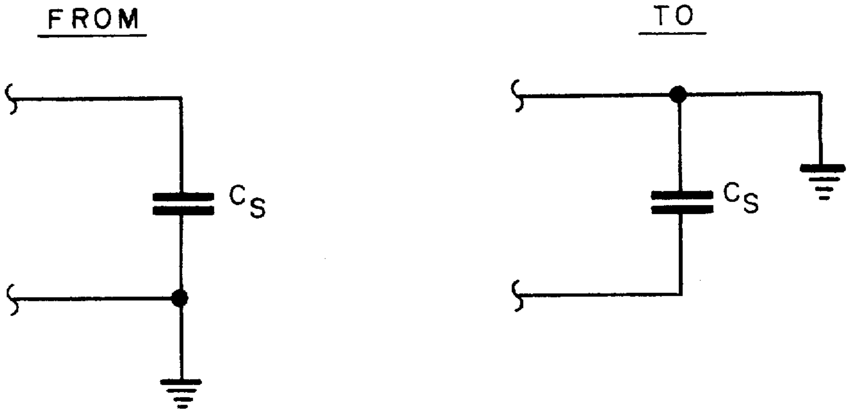

Signed and sealed this 31st day of December 1974.

(SEAL)
Attest:

McCOY M. GIBSON JR.
Attesting Officer

C. MARSHALL DANN
Commissioner of Patents